E. T. SILVIUS.
CREDIT ACCOUNTING REGISTER.
APPLICATION FILED APR. 26, 1911.

1,162,522.

Patented Nov. 30, 1915.
4 SHEETS—SHEET 1.

WITNESSES:
J. H. Gardner.
K. R. Woddell.

INVENTOR:
Ellis T. Silvius.

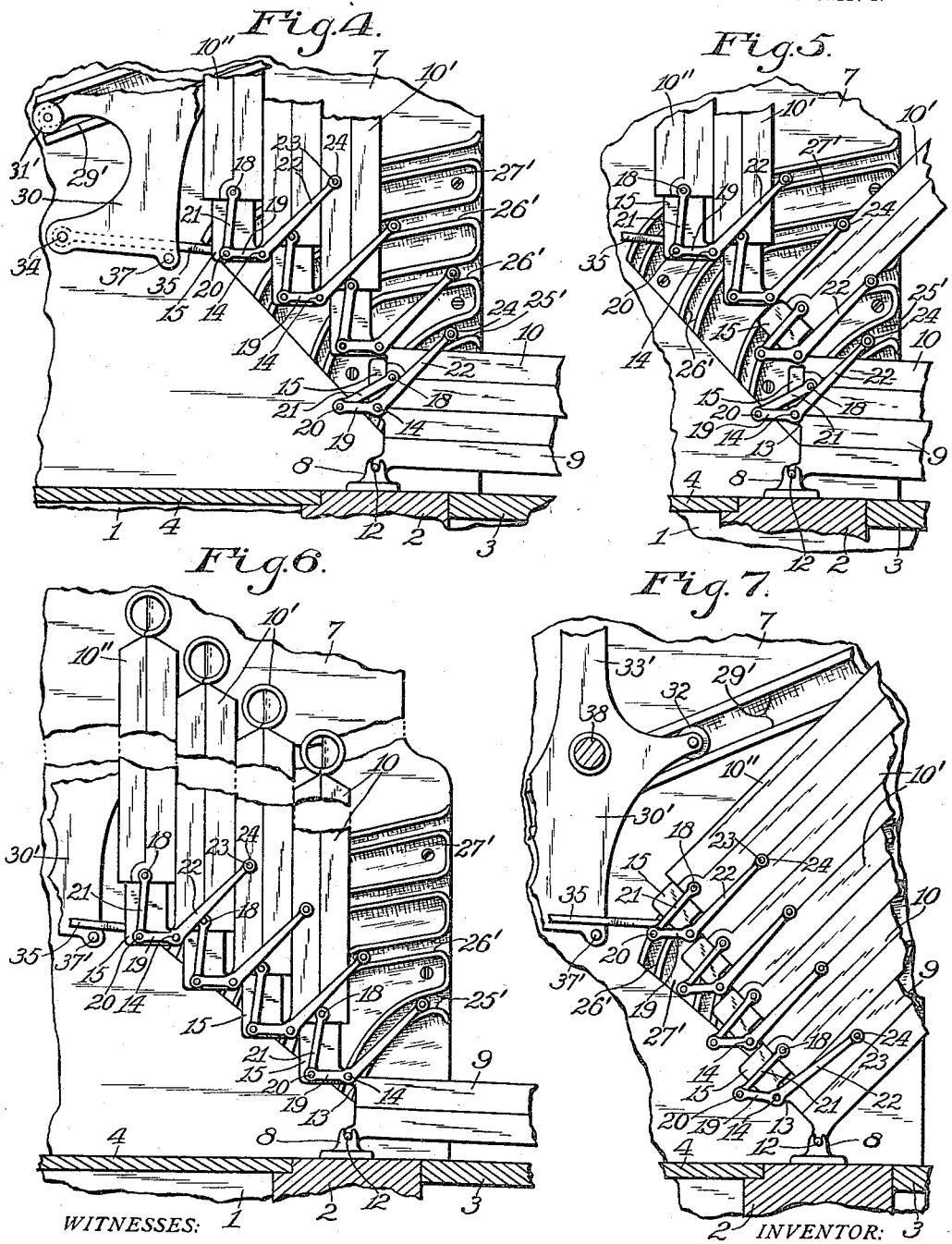

E. T. SILVIUS.
CREDIT ACCOUNTING REGISTER.
APPLICATION FILED APR. 26, 1911.
1,162,522.
Patented Nov. 30, 1915.
4 SHEETS—SHEET 3.
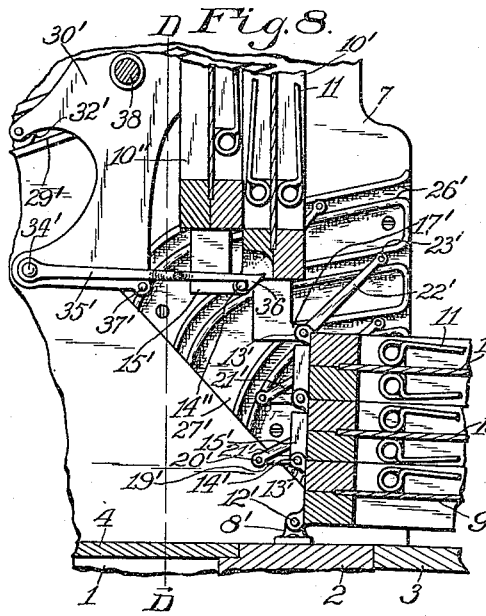
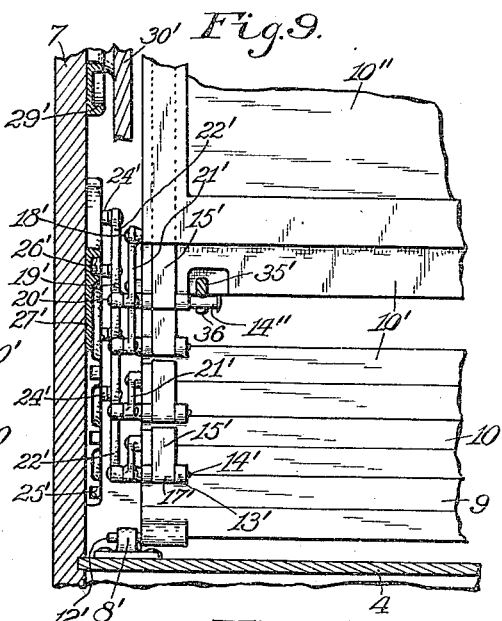
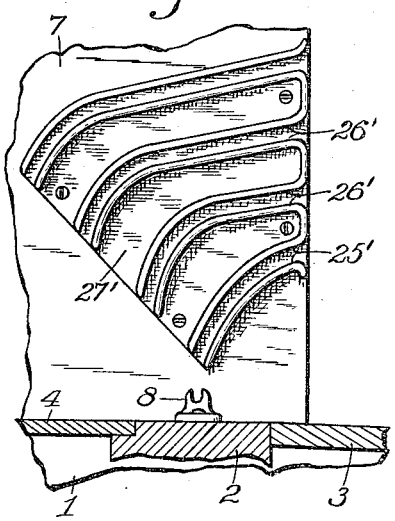
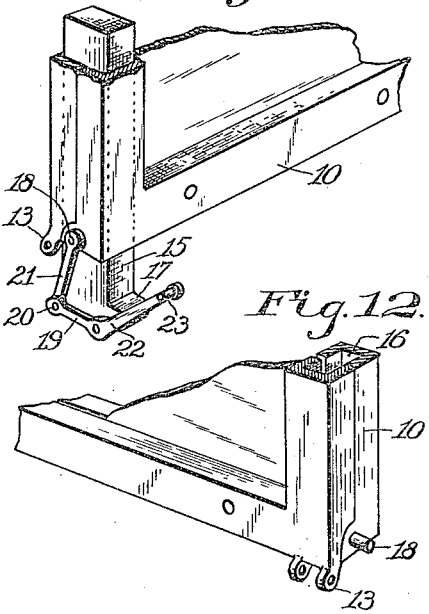
WITNESSES:
J. H. Gardner
K. R. Woddell
INVENTOR:
Ellis T. Silvius

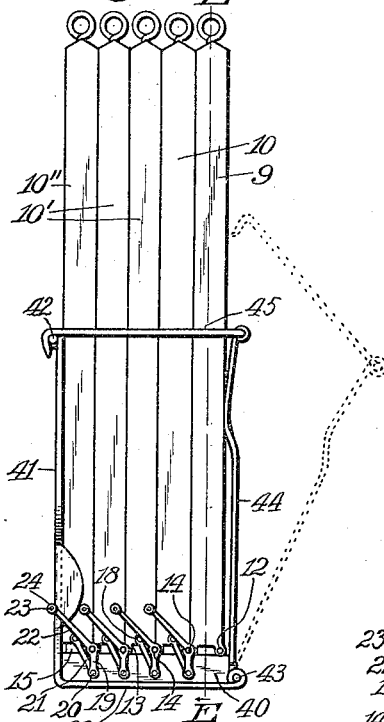
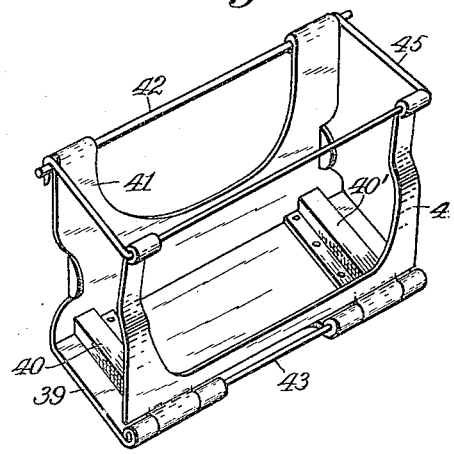
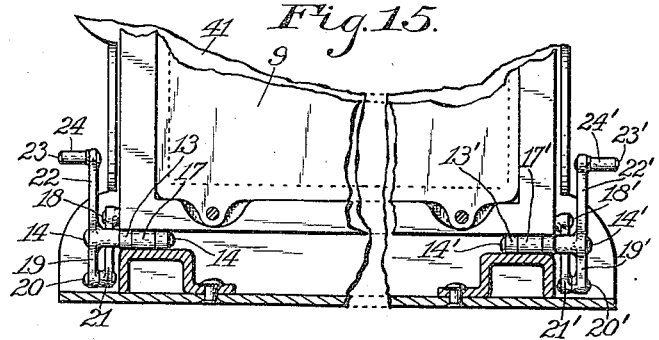
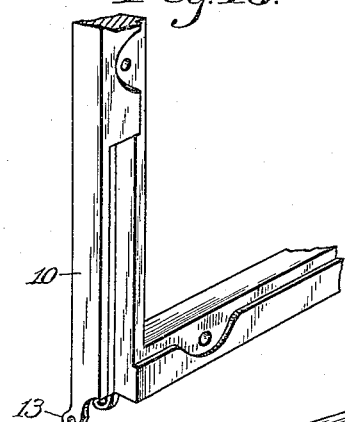
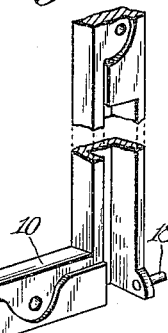
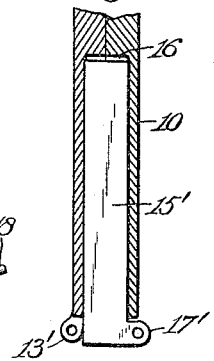
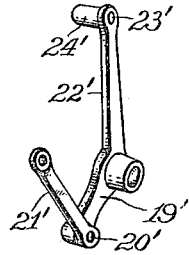

UNITED STATES PATENT OFFICE.

ELLIS T. SILVIUS, OF INDIANAPOLIS, INDIANA, ASSIGNOR, BY MESNE ASSIGNMENTS, TO THE McCASKEY REGISTER COMPANY, (INCORPORATED IN 1914,) OF ALLIANCE, OHIO, A CORPORATION OF OHIO.

CREDIT-ACCOUNTING REGISTER.

1,162,522.   Specification of Letters Patent.   Patented Nov. 30, 1915.

Application filed April 26, 1911.   Serial No. 623,424.

*To all whom it may concern:*

Be it known that I, ELLIS T. SILVIUS, a citizen of the United States, residing at Indianapolis, in the county of Marion and State of Indiana, have invented a new and useful Credit-Accounting Register, of which the following is a specification, reference being had to the accompanying drawings and to the letters and figures of reference marked thereon.

This invention relates to the type of credit accounting register or filing appliance that is commonly used by merchants for systematically keeping credit accounts, or for filing various kinds of papers for future information, the invention having reference more particularly to the devices for connecting the bill holding leaves or frames of the appliance together and permitting the leaves or frames to stand uprightly in normal position in echelon or to lie in prone position in the form of a rectangular pack.

An object of this invention is to provide improved positive controlling means for adjustable hinging connections of filing leaves or frames that will be adapted to operate easily while the leaves are being moved from upright to prone position and vice versa, a further object being to provide leaf hinging connections and controlling mechanism therefor that will be adapted to be cheaply constructed without the necessity of using springs or spring friction devices.

Figure 1:
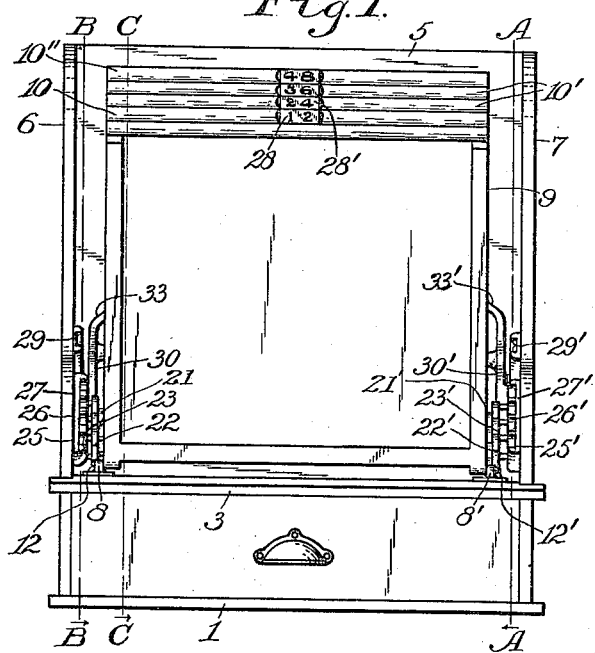
Figure 2:
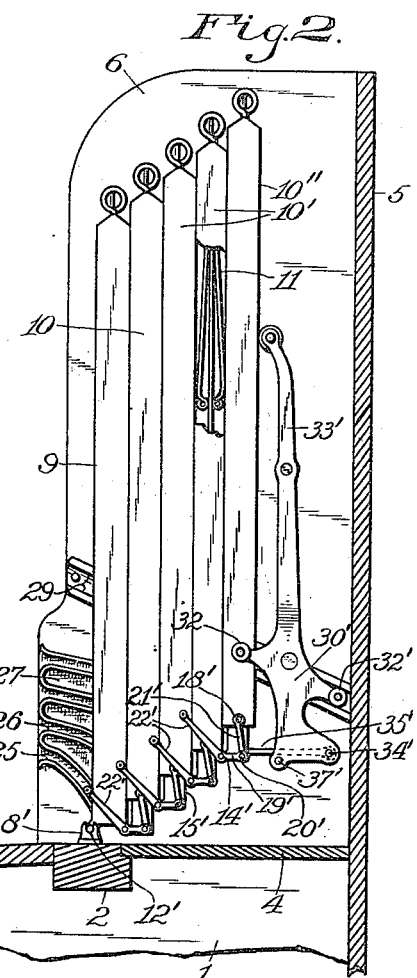
Figure 3:
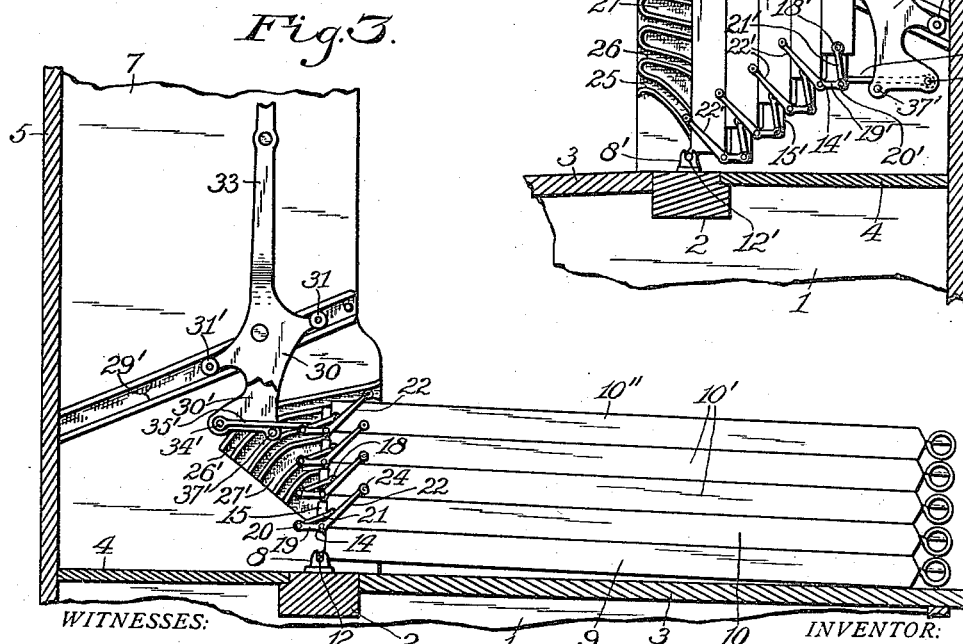

A still further object is to provide improvements in the details of construction of apparatus for maintaining the leaves in true vertical position while being moved forwardly or rearwardly as well as when at rest in normal position.
The invention consists essentially in the combination with bill holding leaves or frames provided with adjustable hinging connections, of controlling means of novel form and arrangement for the hinging connections; and more specifically the invention consists in certain novel parts, and in the combinations and arrangements of parts, as hereinafter particularly described and pointed out in the appended claims.
Referring to the drawings, Figure 1 is a front elevation of a credit accounting register or filing appliance constructed substantially in accordance with the invention; Fig. 2, a fragmentary sectional elevation approximately on the line A A in Fig. 1; Fig. 3, a fragmentary sectional elevation approximately on the line B B in Fig. 1 with the leaves or frames in prone position; Figs. 4, 5, 6 and 7, fragmentary sectional elevations as at the plane of the line B B in Fig. 1 with the leaves shown in various positions in which they may be moved or placed in practical use; Fig. 8, a fragmentary sectional elevation on the line C C in Fig. 1 with the leaves in different positions; Fig. 9, a fragmentary sectional elevation on the plane of the line D D in Fig. 8; Fig. 10, a fragmentary sectional elevation as on the line C C in Fig. 1; Fig. 11, a fragmentary perspective view of one of the leaves and portions of the hinge controlling apparatus; Fig. 12, a fragmentary perspective view of one of the leaves minus portions of the hinging connections; Fig. 13, a side elevation of the leaves arranged in a holder in which they may be placed in a fire proof safe or vault; Fig. 14, a perspective view of the holder; Fig. 15, a fragmentary sectional elevation on the line E E in Fig. 13; Figs. 16 and 17, fragmentary perspective views of portions of a leaf frame when composed of built-up parts; Fig. 18, a fragmentary sectional view of one of the leaves and hinging connections; and Fig. 19, a perspective view of parts of the hinge operating mechanism.

Throughout the different figures of the drawings corresponding elements or features of construction are indicated by similar reference characters as herein referred to.

The invention comprises a suitable case which may be variously constructed, and usually consists of a desk-like part 1 having a substantial rail 2 in the upper portion thereof from which extends a top or lid 3 on which the leaves are supported when in prone position, a floor 4 usually extending from the rail rearward to a back 5 which extends upward to a suitable height and has sides 6 and 7 secured thereto, the case and the leaves constituting a filing cabinet of compact form.

A pair of pivot bearings 8 and 8' are mounted upon the rail 2 for supporting a complete set of suitable filing leaves or frames 9, 10, 10', 10'', all being similar in construction and provided with suitable clamps 11 or such devices as may be preferred for holding papers on the leaves or frames in systematic order. The foremost leaf 9 is provided with a pair of pivots 12 and 12' at the lower forward side thereof which are placed removably in the pivot bearings 8 and 8'. The lower rearward portion of each one of the leaves excepting the rearmost leaf 10'' is provided with hinging ears 13 and 13' in which are hinge pins 14 and 14', respectively. Each one of the leaves excepting the foremost leaf 9 has a pair of hinge-bars 15 and 15' mounted movably in the lower side portions of the leaf in guide-ways 16, the hinge-bars being freely movable longitudinally for adjustment with respect to the leaf and they are provided with hinging-ears 17 and 17' which are connected to the hinge-pins 14 and 14', respectively, of the next adjacent forward one of the leaves. Each one of the leaves excepting the foremost leaf 9 is provided with two pivots 18 and 18'. A suitable number of levers are provided for controlling the movement of the leaves with respect to the hinge-bars, the levers being mounted between their ends on the hinge-pins 14 and 14', respectively, so as to constitute relatively short arms 19 and 19' provided with pivots 20 and 20', respectively, to which connecting rods or links 21 and 21' are connected at one end and at their opposite ends connected to the pivots 18 and 18' of the adjacent rearward leaves, the levers having relatively longer arms 22 and 22' provided with wrist pins 23 and 23', preferably provided with rollers 24 and 24', respectively. The wrist-pins or rollers extend laterally from the arms into suitable guide-ways 25 and 25' or 26 and 26' formed in guide plates 27 and 27' which are secured to the inner sides of the upright sides 6 and 7 respectively of the case. The lowermost guide-ways 25 and 25' are curved substantially throughout their lengths, and the remaining guideways preferably are straight and inclined excepting the rear portions thereof which are curved downwardly somewhat similarly to the guideways 25 and 25'. The guide-ways are designed to maintain the levers in the same relative positions at all times, as for instance the arms 19 and 19' are shown as being horizontal, which arrangement is convenient and they are maintained in horizontal position throughout all the movements of the leaves and also when the leaves are in upright position or in prone position. The levers are most conveniently mounted on the hinge-pins 14 and 14' although not necessarily, it being preferred, however, that the levers turn about the axes of the hinge-pins. The fronts of the upper portions of the leaves are provided with suitable indexing characters, as 28, 28', in order that either leaf may be selected at will and moved to find certain papers desired on the leaves. It will be seen from the foregoing that each one of the leaves excepting the rearmost one supports a pair of hinge-bars and a pair of controlling levers, and that each one of the leaves excepting the foremost one is movable longitudinally on a pair of hinge-bars and moved and controlled by the levers and connecting rods, the levers being guided by means of the guideways in the case.

The sides 6 and 7 are provided on the inner sides thereof with a pair of inclined channel guideways 29 and 29' in which a suitable abutment is movably mounted, the abutment preferably comprising two main parts 30 and 30', one provided with rollers 31 and 31' and the other one provided with rollers 32 and 32', the main parts having upwardly extending arms 33 and 33' thereon which prevent the leaves from tilting rearward from vertical position, the abutment being operatively connected with the leaves. The main parts of the abutment are provided with pivots 34 and 34' to which coupling-bars 35 and 35' are connected, each bar having a hook 36 on its end that engages a wrist-pin 14'' preferably formed as an extension of the rearmost hinge-pins 14 and 14' that connect the two rearmost leaves together. The abutment is provided with stops 37 and 37' on which the coupling-bars may rest when the leaves are removed from the case. Preferably the two main parts of the abutment are connected together by means of a rod 38.

In order to conveniently hold the plurality of leaves together in a rectangular pack when not in use, a suitable holder is provided which comprises a base plate 39 provided with two transversely arranged sills 40 and 40' on which the lower ends of the hinge-bars 15 and 15' may rest, the holder having a side member 41 against which the rearmost one of the leaves may be placed, the member being provided with a horizontal rod 42. The plate 39 is provided with a hinge-rod 43 to which a side member 44 is connected and adapted to engage the foremost one of the leaves, the member 44 being provided with hooks 45 to engage the rod 42 whereby the leaves are clamped together in the holder.

It should be understood that various modifications may be made in the contours or shapes of the controlling levers, especially with reference to the relative angle, for instance, of the arms 19 and 22, and also with respect to the inclination and curvature of the guides for the levers; and various details may be varied within the scope of the claims herein.

In practical use the merchant or attendant may draw all the leaves forward from their normally upright position to prone position; or one or more less than the whole number may be drawn forward, and during the forward movement while the leaves are carried upon the pivots 12 and 12' the controlling levers are guided by means of the guideways in the plates secured to the sides of the case, each leaf when in upright position being supported directly by means of the connecting-rods 21 and 21' which operate to draw the leaves toward their hinge-pins 14 and 14' when the leaves are moved forward pivotally, due to the fact that the connecting rods swing about the pivots 20 and 20'. When the leaves are moved upward from prone position, it is clear that the leaves will be forced upward away from their supporting hinge-pins. When the leaves move forward or backward the coupling bars 35 and 35' rise and fall slightly on their pivots and the abutment is held in substantially constant position relatively to the rearmost leaf, which being pivotally supported at its forward side leans by the force of gravity against the abutment, and for the same reason all the other leaves are inclined to lean rearward by the force of gravity, so that balancing springs are eliminated. When it is desired to remove the leaves from the case the abutment is disconnected therefrom and allowed to rest against the back of the case, the leaves being first drawn forward to form a rectangular pack and then lifted from the pivot bearings 8 and 8' and placed in the holder as shown, from which they may be readily removed and replaced in the case.

Having thus described the invention, what is claimed as new, is—

1. A credit-accounting register including a frame, a plurality of controlled controlling levers operatively connected with the frame and having also separate adjustable pivotal connection with the frame, and supports for the controlling levers.

2. A credit-accounting register including a frame, a plurality of hinge bars having endwise movable connection with the frame, and a plurality of controlling levers pivotally connected to the hinge bars and operatively connected with the frame.

3. A credit accounting register including a frame, a plurality of hinge-bars movably connected with the frame and having hinge-pins therein, and a plurality of controllling levers connected to the hinge-pins and also operatively connected with the frame.

4. A credit accounting register including a frame, a plurality of hinge-bars mounted movably in the frame, a plurality of controlling levers pivotally connected to the hinge-bars, and a plurality of connecting rods pivotally connected to the levers and the frame.

5. A credit-accounting register including a plurality of leaves pivotally supported collectively and having controlling levers pivotally supported between their ends thereon, adjustable hinge devices connecting the leaves together, and means supported by and operatively connecting the levers on each leaf with and supporting the next adjacent one of the leaves.

6. A credit accounting register including a case, a plurality of leaves, adjustable hinge devices connecting the leaves together, pivots supporting the foremost one of the leaves in the case, guides mounted in the case, and means mounted on all excepting the rearmost leaf having movable contact with the guides and operatively connected with the rearward adjacent leaves for their support and for controlling the adjustability of the hinge devices.

7. A credit accounting register including a case, a plurality of leaves arranged uprightly in the case, the foremost one of the leaves being pivotally supported, all excepting the rearmost leaf having hinge-bars pivotally connected thereto, all excepting the foremost leaf being adjustably mounted on the hinge-bars of the adjacent forward leaves, the leaf adjacent the rearmost one having wrist-pins thereon, an abutment movably mounted in the case, and coupling bars pivotally connected to the abutment and having hooks engaging the wrist-pins.

8. A credit accounting register including a plurality of leaves, all excepting the rearmost one having controlling devices movably mounted thereon, each one excepting the foremost one of the leaves being adjustably connected pivotally with the next adjacent forward leaf and also operatively connected with a plurality of the controlling devices of the next adjacent forward leaf, means for pivotally supporting the foremost one of the leaves, and means for maintaining the controlling devices in one and the same position relative to the horizontal during movement of the leaves.

9. A credit accounting register including a case, a plurality of leaves arranged uprightly in the case, the foremost leaf being pivotally supported, all excepting the rearmost leaf having controlling devices movably mounted thereon and having also hinge-bars pivoted thereto, all excepting the foremost leaf being each movable longitudinally on the hinge-bars and operatively connected with the controlling devices of the next adjacent forward leaves, and means mounted in the case with which the controlling devices coöperate for assisting in supporting the leaves.

10. A credit accounting register including a plurality of normally grouped leaves, devices connecting the leaves one to another for pivotal and also relatively longitudinal movement and vertical adjustment of the leaves, a pivot supporting one of the leaves and enabling it to support the remaining leaves, controlling means operatively connected with the leaves and also having a plurality of connections with adjacent leaves for controlling the relative longitudinal movement of the leaves, and means supported independently of the leaves with which the controlling means coöperate independently of the leaves and their connecting devices for guidance to control the longitudinal movement and also the vertical adjustment of the leaves.

11. A credit-accounting register including a plurality of leaves, a plurality of hinge-bars pivotally connected to the leaves excepting the rearmost leaf and having movable guiding contact with the next adjacent leaves excepting the foremost leaf, controlling levers pivotally connected between their ends to the leaves excepting the rearmost leaf, connecting rods pivoted to one end of the levers and also to the leaves adjacent those to which the levers are pivoted, pivots supporting the foremost leaf, and means supported independently of the leaves with which the opposite end of the levers coöperate for controlling the movement of the leaves relative to the hinge-bars.

12. A credit accounting register including a case comprising sides having guideways thereon that have straight portions and also curved portions and also guideways that are curved throughout, a plurality of leaves of which the foremost is pivotally supported in the case, all excepting the rearmost leaf having hinge-bars and also controlling levers pivotally connected thereto on axes common to both, the levers having wrist-pins thereon extending into the guideways, all the leaves excepting the foremost one being guided movably on the hinge-bars of the adjacent forward leaves and having connecting rods pivoted thereto, the rods being connected pivotally to the levers that are on the adjacent leaves.

13. In a filing appliance, the combination with a case, a plurality of frames of which one is pivotally supported in the case, means for connecting the frames together to move pivotally and also longitudinally one to another, and guides supported in the case, of means mounted on and carried by the frames for normally supporting adjacent frames and having sliding contact with the guides for controlling the longitudinal movement and assisting in supporting all excepting the pivotally supported one of the leaves.

14. In a filing appliance, the combination with two adjacent normally upright frames, and means for connecting the two frames together to move pivotally and also longitudinally each with respect to the other, of movable controlling means pivotally connected with and carried by one and bodily supporting the other frame in normal position, and fixedly supported means with which the controlling means is movably connected independently of said connecting means for guidance and control of the controlling means.

15. A credit accounting register including a case, a frame, and a plurality of controlling devices having link connection with the frame and also having movable pivotal connection therewith and guiding engagement with the case.

In testimony whereof, I affix my signature in presence of two witnesses.

ELLIS T. SILVIUS.

Witnesses:
H. L. STALEY,
HARRY D. PIERSON.

Copies of this patent may be obtained for five cents each, by addressing the "Commissioner of Patents, Washington, D. C."